United States Patent [19]

Brand et al.

[11] Patent Number: 4,963,332
[45] Date of Patent: Oct. 16, 1990

[54] METHOD FOR THE CATALYTIC REMOVAL OF NITROGEN OXIDES FROM EXHAUST GASES BY MEANS OF A REDUCING AGENT

[75] Inventors: Reinhold Brand; Bernd Engler, both of Hanau; Peter Kleine-Moellhoff; Edgar Koberstein, both of Alzenau, all of Fed. Rep. of Germany

[73] Assignee: Degussa Aktiengesellschaft, Frankfurt, Fed. Rep. of Germany

[21] Appl. No.: 384,754

[22] Filed: Jul. 25, 1989

[30] Foreign Application Priority Data

Jul. 25, 1988 [DE] Fed. Rep. of Germany ....... 3825206

[51] Int. Cl.$^5$ .......................... C01B 21/00; B01J 8/00; G01N 21/00
[52] U.S. Cl. .................................... 423/235; 423/239; 422/62
[58] Field of Search ................... 423/235, 235 D, 239, 423/239 A; 422/62

[56] References Cited

U.S. PATENT DOCUMENTS 4,735,785  4/1988  Eichholtz et al. .................. 423/239

Primary Examiner—Gregory A. Heller
Attorney, Agent, or Firm—Beveridge, DeGrandi & Weilacher

[57] ABSTRACT

A method for the removal of nitrogen oxides contained in exhaust gases of an optionally fluctuating composition with a temperature of 0°–600° C. by means of catalytic reduction at a preselected stoichiometric ratio between the concentration of reducing agent and the concentration of nitrogen oxide in which the reducing agent is dosed in a pulsed manner.

5 Claims, 1 Drawing Sheet

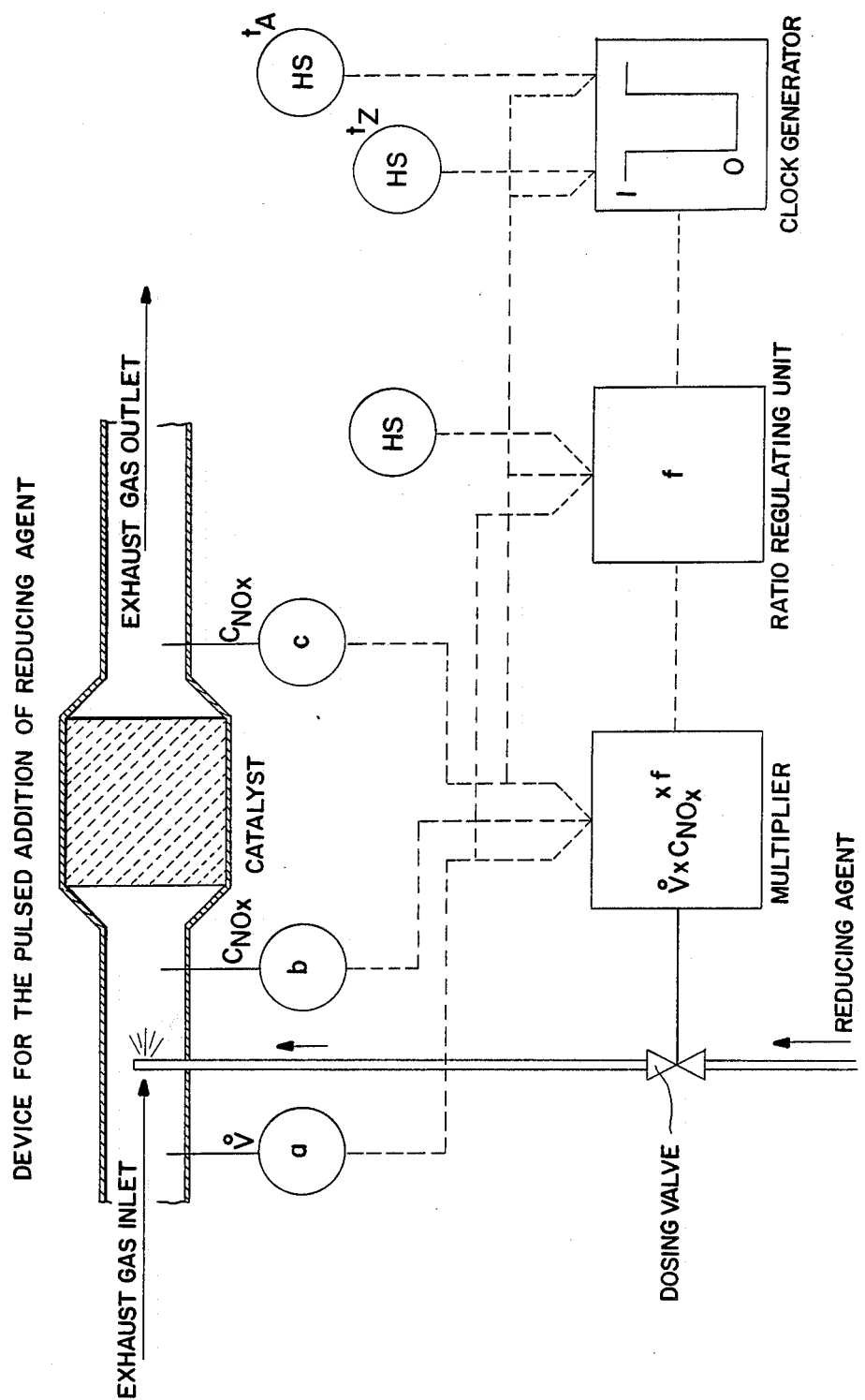

METHOD FOR THE CATALYTIC REMOVAL OF NITROGEN OXIDES FROM EXHAUST GASES BY MEANS OF A REDUCING AGENT

INTRODUCTION AND BACKGROUND

The present invention relates to a method for removing nitrogen oxides contained in exhaust gases, particularly an optionally fluctuating composition, with a temperature from 0°–600° C. by treating the exhaust gases with a reducing agent on a catalyst at a preselected stoichiometric ratio between the concentration of reducing agent and the initial concentration of nitrogen oxide.

Nitrogen oxides, which are produced primarily in combustion processes, are among the main causes of acid rain and of photosmog and the damage to the environment associated therewith. These oxides should therefore be eliminated to as large an extent as possible by being removed from exhaust combustion gases before they are released into the environment.

The primary sources of nitrogen oxide emissions are motor vehicle traffic, stationary internal combustion engines, powerplants, heating plants, steam generators for industrial purposes and industrial production plants.

The elimination or decrease of nitrogen oxides takes place as a rule by means of catalytic reduction reactions. Ammonia is the main reducing agent used since it reacts in a largely selective manner with the nitrogen oxides even in an oxygen containing atmosphere.

However, reducing agents which contain or split off ammonia such as e.g. urea and also $H_2$, CO and hydrocarbons can also be used.

It was found that the conventional catalysts exhibit a more or less distinct adsorption or storage capability for the reducing agent used in the process, depending on the composition of the catalyst as a function of the processing temperature. This quality can adversely affect the reducing action of the catalyst, e.g. in the case of fluctuating nitrogen oxide contents in the flue or exhaust gas. Diminished nitrogen oxide reduction rates or undesired breakdowns of reducing agent can occur. It was futhermore found that the adsorbed reducing agent blocks active centers of the catalyst and thus decreases the reducing capacity of the catalyst.

SUMMARY OF THE INVENTION

The present invention seeks to avoid these undesirable effects by means of a discontinuous addition of the reducing agent.

Thus, a feature of the present invention resides in a method for the removal of nitrogen oxides contained in all types of exhaust gases, particularly those of a fluctuating composition, with a temperature of 0°–600° C. by means of treating the exhaust gases with a reducing agent on a catalyst at a preselected stoichiometric ratio between the concentration of reducing agent and the initial concentration of nitrogen oxide. In more particular detail, the method is carried out by dosing the reducing agent into the exhaust gas to be treated in a discontinuous manner in pulses $t_A$ of 0.1 to 15,000, preferably 0.5 to 300 and especially 1 to 90 sec. duration with stop intervals $t_Z$ therebetween of 0.1 to 15,000, preferably 0.5 to 300 and especially 1 to 90 sec. duration.

The pulse time $t_A$ for the addition of reducing agent, e.g. an addition of ammonia, and the duration of the stop interval $t_Z$ are a function of the type of catalyst used, the exhaust-gas temperature and the exhaust-gas composition, whereby the influence of the exhaust-gas temperature is dominant.

It has been observed that the stop time $t_Z$ for closing the dosing valve for the addition of reducing agent must be shorter at rather high temperatures than the opening time $t_A$ of the dosing valve in order to avoid a decline of the catalytic activity. However, it can also be advantageous in the case of a rising concentration of $NO_x$ in the non-treated exhaust gas to lengthen the closing time of the dosing valve somewhat relative to the opening time.

Essentially, however, an advantageous embodiment of the method of the invention provides that the dosing time for the reducing agent is made longer than the stop interval at exhaust-gas temperatures of 250°–600° C. and at temperatures under 250° C. the inverse procedure is used.

BRIEF DESCRIPTION OF THE DRAWING

The drawing shows a schematic representation of the process of the invention.

DETAILED DESCRIPTION OF THE INVENTION

In practice, a measuring and regulatory control of the method has proven to be advantageous, as illustrated in the drawing, in which the particular exhaust gas flow (a) and the particular concentration of nitrogen oxide analytically determined in the exhaust gas are measured before and after the catalyst (b) and (c). This measurement results in obtaining proportional signals, signals (a), (b) and (c) which are introduced into a multiplier. Signals (a) and (c) are also introduced into a ratio regulating unit for setting the stoichiometric ratio (f). Signal (c) is also sent to a clock generator for a 0/1 signal whose particular signal duration, which influences the slip in nitrogen oxide, can be adjusted manually or automatically as a function of (c). The clock generator controls the multiplier via the ratio regulating unit. The multiplier provides a signal proportional to the product of (a), (b) and (f) to a dosing valve for the reducing agent in such a manner that when the 0 signal $t_Z$ appears (for (f)=0), the valve is closed and when the 1 signal $t_A$ appears, the valve is opened in accordance with the preselected value of (f).

The invention is explained in more detail in the following using a description of the measuring and regulatory design with reference made to the figure of the drawing.

The circuit used in accordance with the invention consists of the flow measurement of the exhaust gas or of a signal proportional to the flow (a), and consists of the analysis of nitrogen oxide (b) and (c) before and after catalyst, of the multiplier, the ratio regulating unit for the ratio (f), the clock generator and of the dosing valve.

The multiplier supplies a signal to the dosing valve which is proportional to the product of flue gas flow V, concentration of nitrogen oxide before catalyst (C $NO_x$) and the stoichiometric ratio of reducing agent concentration/nitrogen oxide concentration (f). The stoichiometric ratio is put on the multiplier with the aid of the ratio regulating unit. The stoichiometric ratio can be adjusted manually or automatically via the exhaust gas analyses (b) and (c). For its part, the ratio regulating unit is controlled by the clock generator, which supplies a 0/1 signal. At the 0 signal, the stoichiometric ratio to set to 0 so that the dosing valve closes. At the 1 signal, the stoichiometric ratio is released in accordance with the given concentration of $NO_x$ in the exhaust gas treated and the dosing valve is opened in a corresponding manner. The signal duration of the 0 and of the 1 signals and therewith the opening and closing times of the dosing valve can be set manually, taking into consideration the NOx analysis (c) or automatically set via an analysis of the flue gas (c).

The method of the invention was carried out in a system for the selective, catalytic removal of nitrogen from a flue gas resulting from a natural gas combustion by means of ammonia. The technical data is presented in Table 1.

The catalyst in Table 1 is in four layers, one connected after the other. The composition of the catalyst is:
90% by weight $TiO_2$ (Anatas)
9.5% by weight $WO_3$
0.5% by weight $V_2O_5$.

The dimensions are (per layer=per element):
150×150 mm (frontal cross-section)
150 mm (length)
Cell division: 4.25 mm; (cell opening=3.5 mm+partition=0.75 mm).

TABLE 1

| Flue gas flow | 100 m³/h in normal state, moist |
|---|---|
| Catalyst volume | 4 layers at 3.375 l |
| Flue gas temperature | 200° C. |
| Reducing agent | ammonia |
| Flue gas composition | |
| $O_2$ | 8.6% by vol. |
| $CO_2$ | 7.5% by vol. |
| $H_2O$ | 15.0% by vol. |
| $NO_x$ | approx. 500 ppm |
| Stoichiometric ratio (f) at 1 signal | 2.25 |
| Signal duration of 1 signal ($t_A$) | 40 sec. |
| Stoichiometric ratio (f) at 0 signal | 0 |
| Signal duration of 0 signal ($t_Z$) | 60 sec. |
| Nitrogen oxide conversion | 90%. |

Without using the present invention, that is, with a continuous addition of reducing agent proportional to volumetric flow V of the exhaust gas and to the nitrogen oxide concentration (b) of the untreated exhaust gas, a constant decline of the conversion of nitrogen oxide to approximately 20% within 400 hours was observed.

On the other hand, with a pulsed dosing of the reducing agent in accordance with the operating data of Table 1, almost constant conversion rates of nitrogen oxide were able to be achieved during an observation time of 2,000 hours (drop to only 85% conversion). This shows that the reduction of nitrogen oxides on the catalyst continues practically without being influenced within a selected closing interval. Since all customary nitrogen oxide reducing catalysts exhibit the observed property, the method can be used without restriction.

Hence, the present invention can be used with all conventional nitrogen oxide reducing catalysts.

Further variations and modifications of the foregoing will be apparent to those skilled in the art and are intended to be encompassed by the appended claims.

German priority application No. P 38 25 206.6-43 is relied on and incorporated by reference.

We claim:

1. A method of removing nitrogen oxides contained in exhaust gases with a temperature from 0°-600° C. comprising treating said exhaust gases with a reducing agent in the presence of a nitrogen oxide reducing catalyst having active centers at a stoichiometric ration between the concentration of reducing agent and the initial concentration of nitrogen oxide, dosing the reducing agent into the exhaust gas to be treated in a controlled discontinuous manner in such a manner to avoid adsorption of the reducing agent and blocking of the active centers of said catalyst by said reducing agent, said dosing being in pulses $t_A$ of 0.01 to 15,000 sec. duration with stop intervals $t_Z$ therebetween of 0.1 to 15,000 sec. duration.

2. The method according to claim 1, wherein the reducing agent is dosed in pulses $t_A$ of 0.5 to 300 seconds duration with stop intervals of 0.5 to 300 seconds duration.

3. The method according to claim 1, wherein the reducing agent is dosed in pulses $t_A$ of 1 to 90 seconds duration with stop intervals $t_Z$ of 1 to 90 seconds duration.

4. The method according to claim 1, wherein the dosing time for the reducing agent is made longer than the stop interval at exhaust-gas temperatures of 250°-600° C. and at temperatures under 250° C. the dosing time is shorter than the stop interval.

5. The method according to claim 1, wherein the particular exhaust gas flow (a) and the particular concentration of nitrogen oxide analytically determined in the exhaust gas is measured before and after the catalyst (b) and (c) to obtain proportional signals, signals (a), (b) and (c) which are introduced into a multiplier and signals (a) and (c) are introduced into a ratio regulating unit for the stoichiometric ratio (f) and signal (c) is introduced into a clock generator for a 0/1 signal whose particular signal duration, which influences the slip in nitrogen oxide can be adjusted manually or automatically as a function of (c), whereby the clock generator controls the multiplier via the ratio regulating unit and the multiplier puts a signal proportional to the product of (a), (b) and (f) onto a dosing valve for the reducing agent in such a manner that when the 0 signal $t_Z$ appears (for (f)=0), the valve is closed and when the 1 signal $t_A$ appears, the valve is opened in accordance with the preselected value of (f).

* * * * *